United States Patent
Meggiolan

(10) Patent No.: US 9,724,959 B2
(45) Date of Patent: Aug. 8, 2017

(54) BICYCLE WHEEL AND RELATIVE MANUFACTURING PROCESS

(71) Applicant: Campagnolo S.r.l., Vicenza (IT)

(72) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 501 days.

(21) Appl. No.: 13/919,490

(22) Filed: Jun. 17, 2013

(65) Prior Publication Data

US 2013/0342003 A1    Dec. 26, 2013

(30) Foreign Application Priority Data

Jun. 15, 2012 (IT) .............................. MI2012A1042

(51) Int. Cl.
| | |
|---|---|
| *B60B 3/14* | (2006.01) |
| *B60B 1/00* | (2006.01) |
| *B60B 1/04* | (2006.01) |
| *B60B 31/00* | (2006.01) |
| *B60B 3/04* | (2006.01) |

(52) U.S. Cl.
CPC .............. *B60B 1/003* (2013.01); *B60B 1/041* (2013.01); *B60B 1/042* (2013.01); *B60B 1/043* (2013.01); *B60B 3/04* (2013.01); *B60B 31/00* (2013.01); *B60B 31/005* (2013.01);
(Continued)

(58) Field of Classification Search
CPC .. B60B 1/02; B60B 1/04; B60B 1/042; B60B 1/043; B60B 1/06; B60B 1/14; B60B 3/08; B60B 3/082; B60B 3/085; B60B 3/087; B60B 3/14; B60B 9/00; B60B 9/26; B60B 1/003; B60B 1/041; B60B 3/04; B60B 31/00; B60B 31/005; B60B 2310/316; B60B 2310/318

USPC ....... 301/35.56, 35.57, 35.61, 37.24, 37.106, 301/37.107, 54, 55, 58, 59, 63.101,
(Continued)

(56) References Cited

U.S. PATENT DOCUMENTS 1,464,495 A  *  8/1923 Booth ................... B60B 31/005
                                                        157/1
1,742,044 A     12/1929 Meldrum
(Continued)

FOREIGN PATENT DOCUMENTS

| FR | 2128155 A1 | 10/1972 |
|---|---|---|
| JP | H04-071901 A | 3/1992 |
| WO | 0035683 A1 | 6/2000 |

OTHER PUBLICATIONS

Search Report for Italian Application IT MI20121042 dated Mar. 7, 2013.
(Continued)

*Primary Examiner* — John Walters
(74) *Attorney, Agent, or Firm* — Volpe and Koenig, P.C.

(57) ABSTRACT

A bicycle disc wheel or spoked wheel (10) is disclosed, comprising a hub (12), a rim (14) and at least one disc or spoke-type structural element (60) integral with the hub (12) and the rim (14), wherein said at least one structural element (60) is pretensioned. A process for manufacturing thereof comprises the sequential steps of providing a hub (12) and a rim (14), applying a compression on the rim (14) towards the hub (12) elastically deforming it, rendering at least one disc or spoke-type structural element (60) integral with the hub (12) and the rim (14), and removing the compression onto the rim (14) applied in step a).

19 Claims, 10 Drawing Sheets

Figure 1:
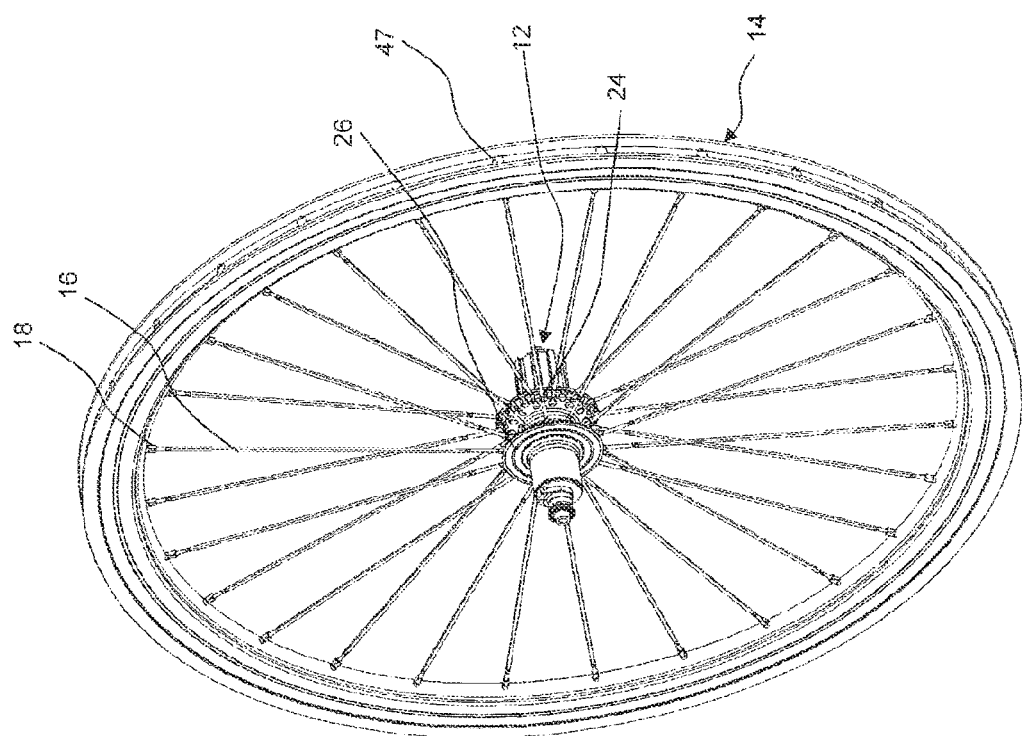

(52) U.S. Cl.
CPC ... *B60B 2310/316* (2013.01); *B60B 2310/318* (2013.01); *B60B 2900/311* (2013.01)

(58) Field of Classification Search
USPC ............ 301/63.102, 64.101, 64.301, 64.304, 301/64.704, 64.706
See application file for complete search history.

(56) References Cited

U.S. PATENT DOCUMENTS

| | | | |
|---|---|---|---|
| 4,835,857 A | | 6/1989 | Michelotti |
| 5,104,199 A | * | 4/1992 | Schlanger ............... B60B 1/003 301/64.704 |
| 5,540,485 A | | 7/1996 | Enders |
| 5,931,544 A | * | 8/1999 | Dietrich .................. B60B 1/003 301/58 |
| 6,520,595 B1 | | 2/2003 | Schlanger |
| 6,899,401 B2 | * | 5/2005 | Schlanger ............... B60B 1/003 301/110.5 |
| 7,357,460 B2 | * | 4/2008 | Schlanger ............. B60B 1/0261 301/104 |
| 8,528,991 B2 | * | 9/2013 | Schlanger ............... B60B 1/003 301/55 |
| 2010/0253132 A1 | | 10/2010 | Schlanger |

OTHER PUBLICATIONS

European Office Action, Appln. No. 13 171 863.7 1752, issued May 8, 2015.
Chinese Office Action for Application No. 201310239505.9, dated Jun. 29, 2016, with English translation.
Japanese Office Action for Application No. 2013-125415, dated Jan. 17, 2017, with English translation.

* cited by examiner

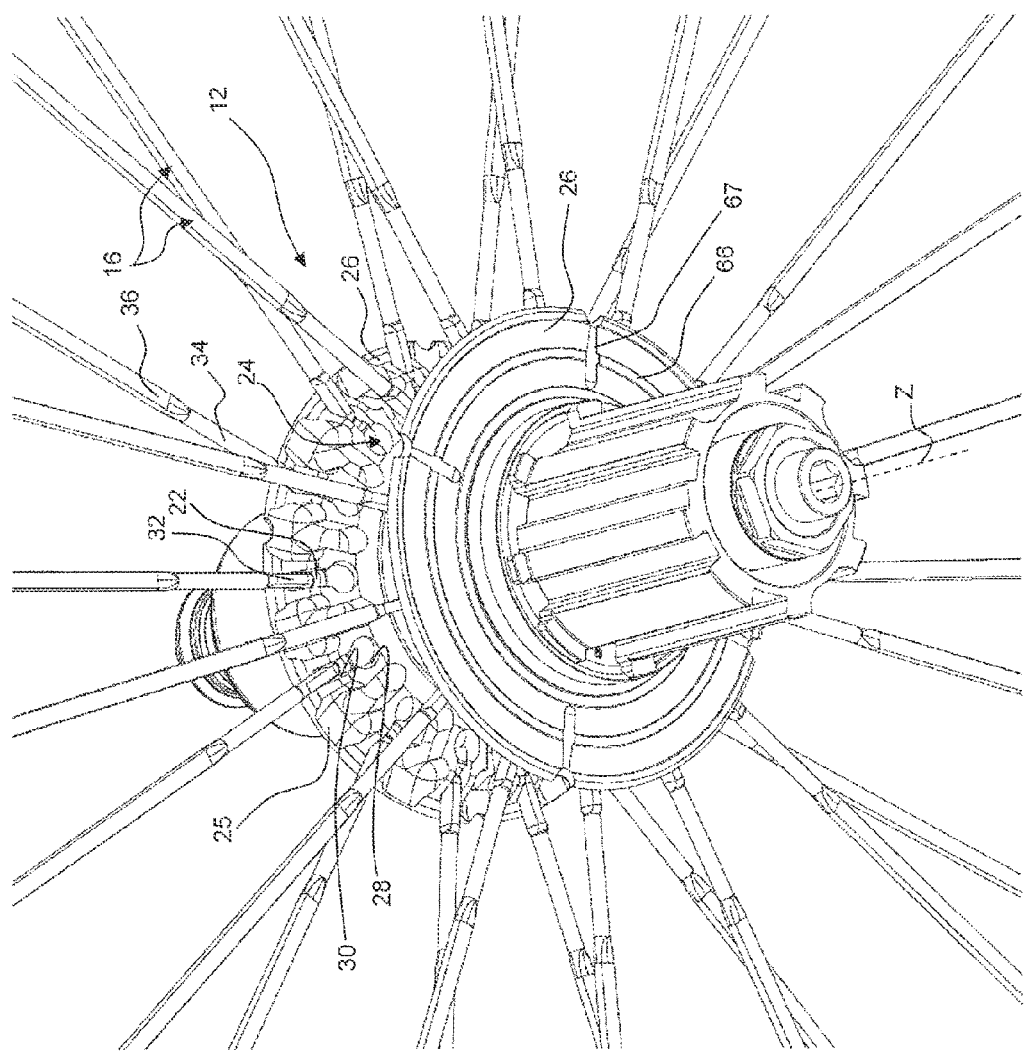

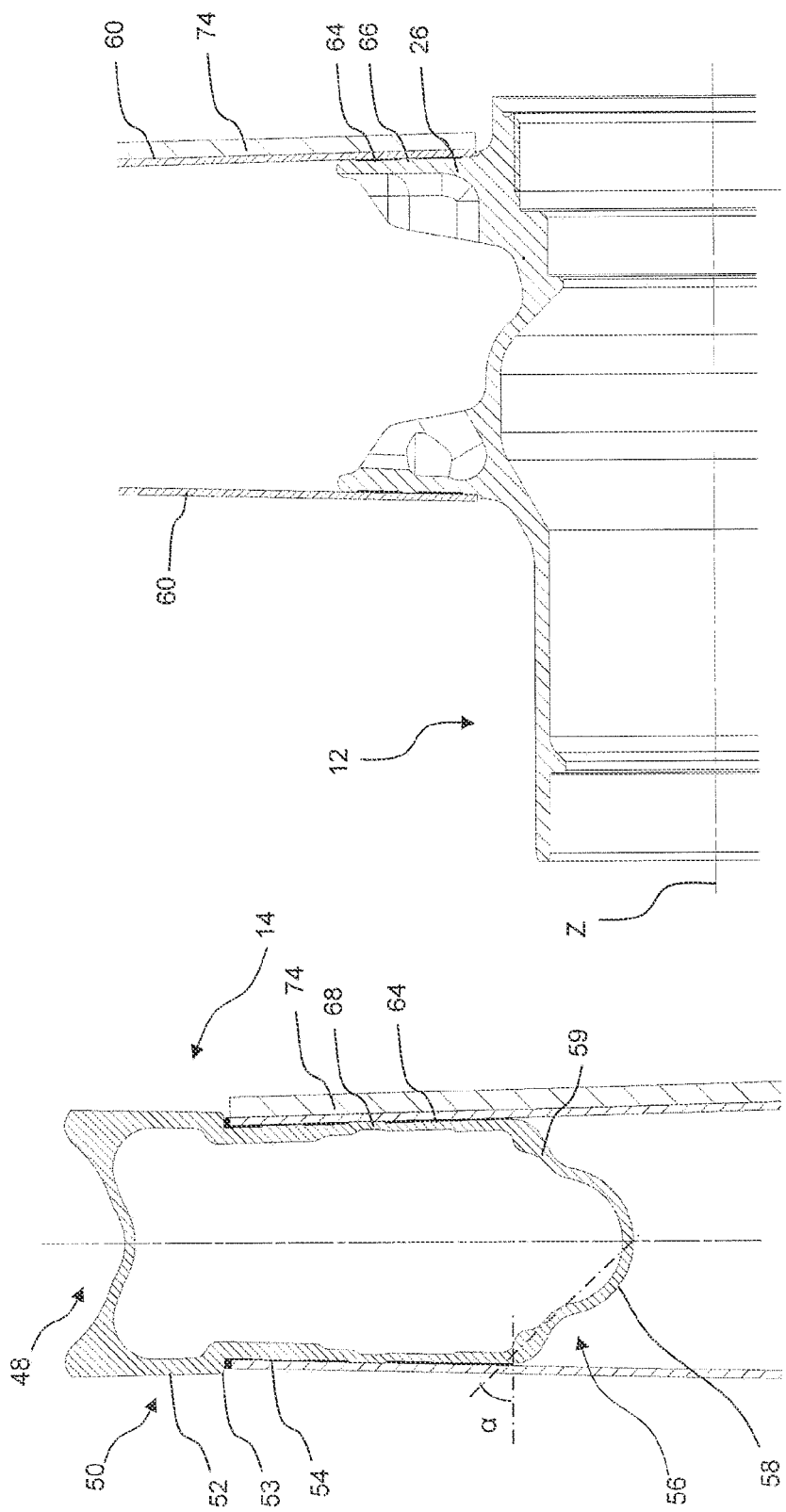

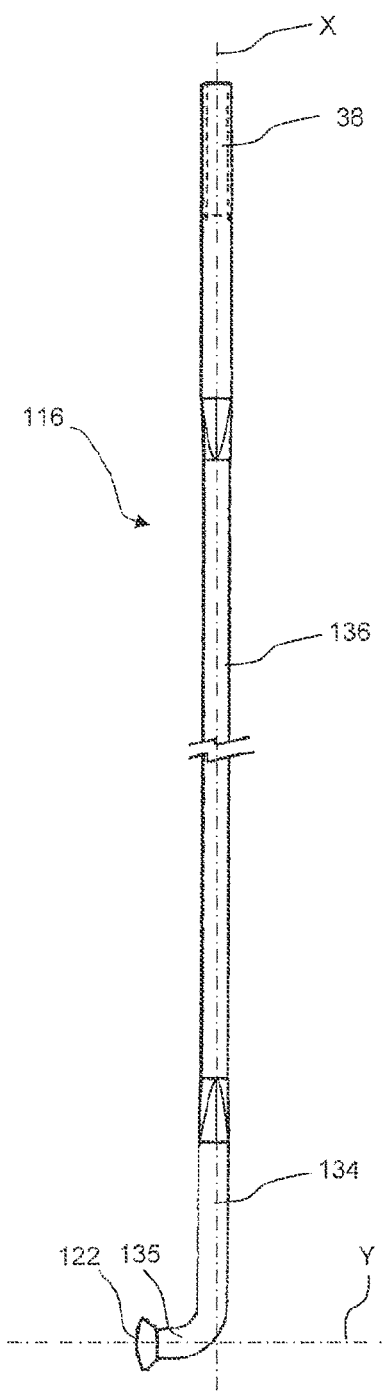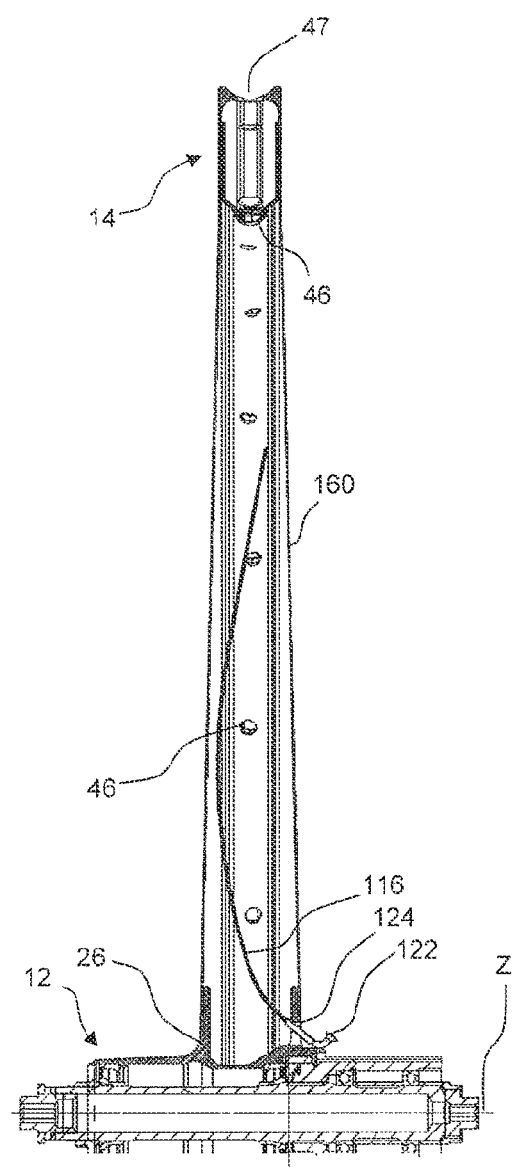
Fig. 15
Fig. 18

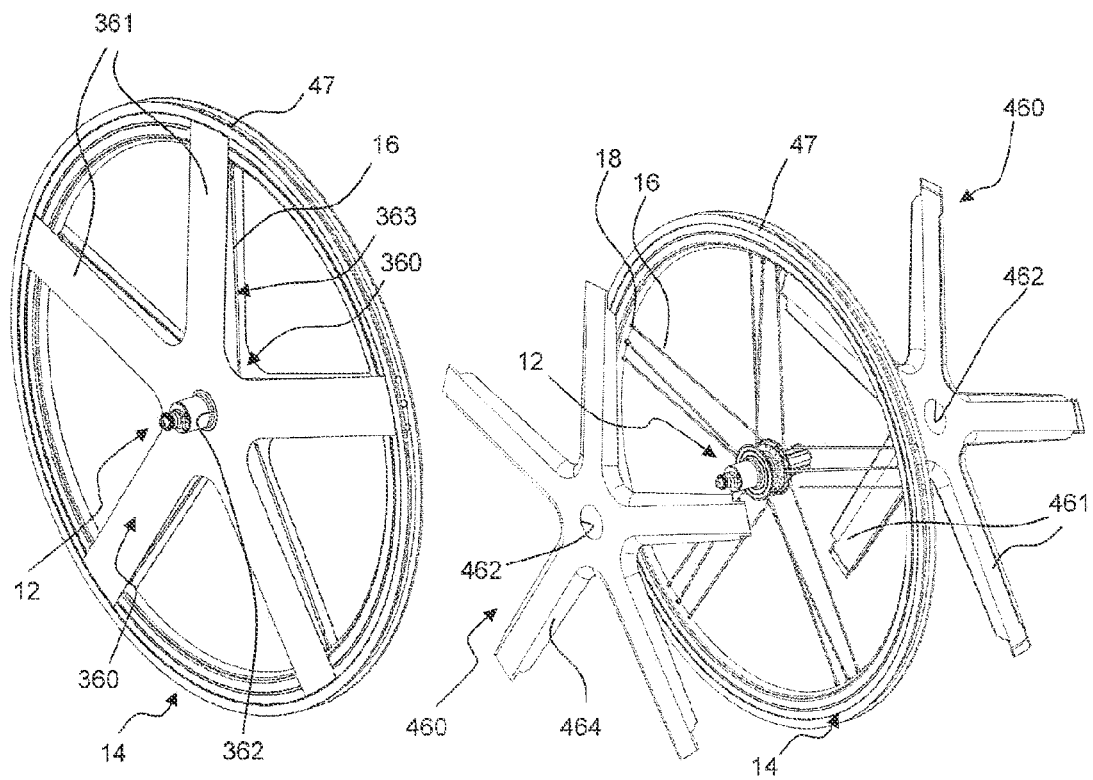
Fig. 20
Fig. 21
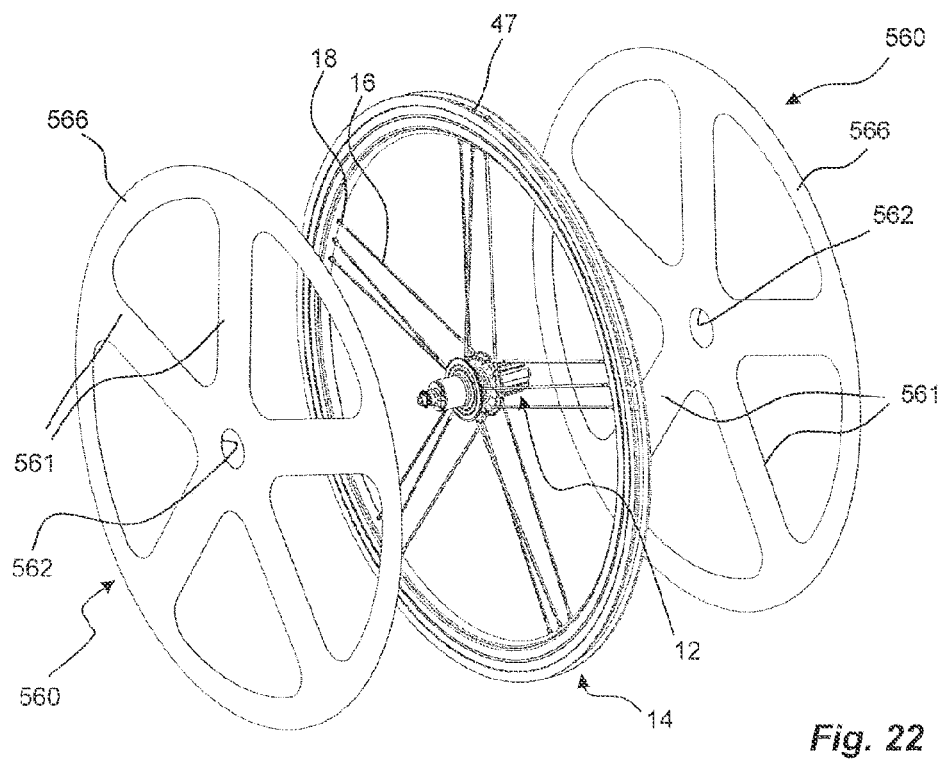
Fig. 22

BICYCLE WHEEL AND RELATIVE MANUFACTURING PROCESS

The present invention concerns a bicycle wheel, as well as a manufacturing process thereof. In particular the invention concerns a bicycle disc wheel also known simply as lenticular wheel or disc, and a spoked wheel.

Bicycle wheels with spokes made from composite material by injection or compression moulding are known. For example, U.S. Pat. No. 5,540,485 discloses a manufacturing process of a composite bicycle spoked wheel wherein filaments of fibre are wound on an inflatable mandrel and, in a mould, the mandrel is inflated to pre-stress the fibres before the thermosetting or thermoplastic resin matrix solidifies.

Bicycle disc wheels are also known comprising a spoked wheel and a pair of discs applied outside of the spoked wheel. The mechanical stresses are borne by the spokes, while the discs are provided exclusively for aesthetic and aerodynamic reasons and have no structural function.

The technical problem at the basis of the invention is to make a disc or spoked wheel that has a particularly high resistance to stresses and that maintains a correct geometry, in terms of centering between hub and rim and circularity of the rim.

The Applicant has perceived that such a problem can be solved through a pre-tensioning of the discs or of the spokes.

In an aspect, the invention concerns a process for manufacturing a bicycle disc wheel or spoked wheel, comprising the sequential steps of:

a) providing a hub and a rim,
b) applying a compression onto the rim towards the hub elastically deforming it,
c) rendering at least one disc or spoke-type structural element integral with the hub and the rim, and
d) removing the compression onto the rim applied in step b).

The Applicant believes that by rendering the disc or spoke-type element integral with the hub and the rim when the rim is compressed towards the hub, and subsequently releasing such compression, the disc or spoke-type element preserves a tensile stress and therefore obtains a structural role that replaces that of the tensioned spokes in a conventional spoked wheel.

In step b), the compression on the rim can be applied by pulling the rim towards the hub from a position radially inside the rim, or by pushing the rim towards the hub from a position radially outside the rim.

Preferably, said at least one structural element comprises a pair of disc or spoke-type structural elements, each rendered integral with the hub and the rim.

Preferably, step b) comprises extending a plurality of tensioning elements between the hub and the rim and tensioning them.

In this case, preferably step d) comprises removing the tensioning elements.

More preferably, the tensioning elements comprise bicycle spokes.

Preferably, the bicycle spokes are oversized with respect to a bicycle spoked wheel comprising said hub and said rim. In this way, the tensioning spokes are stronger and undergo less percentage elongation during tensioning.

Preferably, step b) comprises the step of controlling the centering and the circularity of the wheel during the application of the compression.

Preferably, step c) comprises inserting a pair of disc or spoke-type structural elements onto the hub from axially opposite ends.

Preferably, step c) comprises the step of gluing said at least one disc or spoke-type structural element to the hub and to the rim.

Preferably, step c) comprises the step of gluing through a bicomponent epoxy resin.

Preferably, step c) comprises press gluing said at least one structural element, more preferably while it is removably associated with a respective support applicator.

Preferably, step b) comprises the step of simulating the stress on the rim and/or on the hub during the subsequent gluing step.

Preferably, step d) comprises unseating the tensioning elements from a respective seat in a flange of the hub towards an opposite flange.

Alternatively, step d) comprises removing the tensioning elements by unthreading them through a respective seat in a flange of the hub.

Preferably, step d) comprises removing the tensioning elements from an opening in a tyre coupling channel in the rim.

Alternatively, when the structural elements are of the open spoke type, step d) can comprise removing the tensioning elements from a gap between two opposite spokes of the two structural elements.

In an aspect thereof, the invention concerns a bicycle disc wheel or spoke-type wheel, comprising a hub, a rim and at least one disc or spoke-type structural element rendered integral with the hub and the rim, wherein said at least one structural element is pretensioned.

The existence of such pre-tensioning can be verified in a wheel for example by making a cut in the structural element and checking whether the edges of the cut move apart and/or whether the geometry of the rim moves away from circularity and/or whether rim and hub become offset from one another.

Preferably, said at least one structural element comprises a pair of disc or spoke-type structural elements, each rendered integral with the hub and rim.

Preferably, the spokes of the spoke-type structural elements are in corresponding angular positions so as to be facing.

In the disc or spoked wheel according to the invention, preferably the hub and/or the rim comprise a plurality of spoke attachment seats, but there are no spokes extending between the hub and the rim.

Preferably, the hub comprises a pair of flanges having facing faces and the plurality of spoke attachment seats are hollowed out in the facing faces of the flanges.

In this way, the non-facing faces of the flanges, namely those axially outside of the wheel, advantageously have no seats and therefore have a full surface suitable for gluing the structural elements. Moreover, making the seats on the facing faces of the flanges allows the spokes to be unseated for their removal, despite the presence of the two structural elements.

Preferably, the hub and/or the rim comprise projecting lugs at the areas of contact with said at least one structural element. Such projecting lugs ensure the formation of a film of gluing substance of suitable thickness between the hub and/or the rim and the structural elements.

Preferably, said at least one structural element is made of composite material. Such an embodiment, with respect to being made of metal, offers the advantage of the wheel being lighter the strength being equal.

Preferably, said at least one structural element made of composite material comprises fibre extending along a plurality of radial directions and/or fibre extending along a plurality of chord directions, which gives high strength to the wheel.

Preferably, said at least one structural element is glued to the rim and to the hub, more preferably through a bicomponent epoxy resin.

Figure 16:
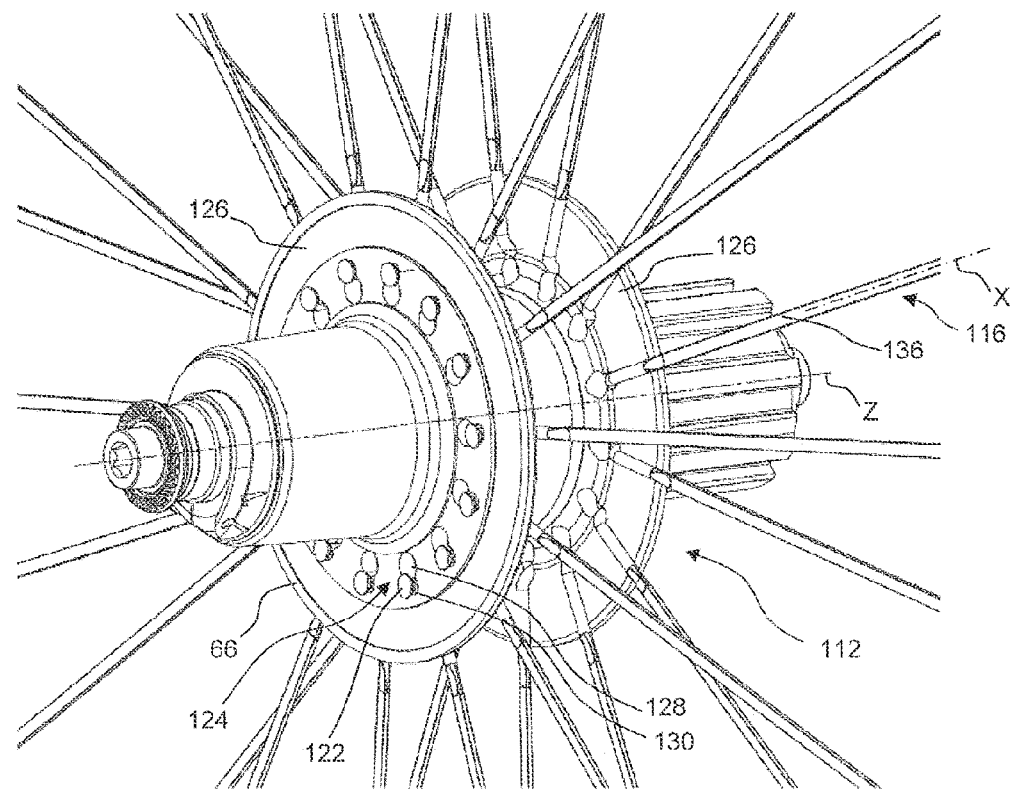
Figure 17:
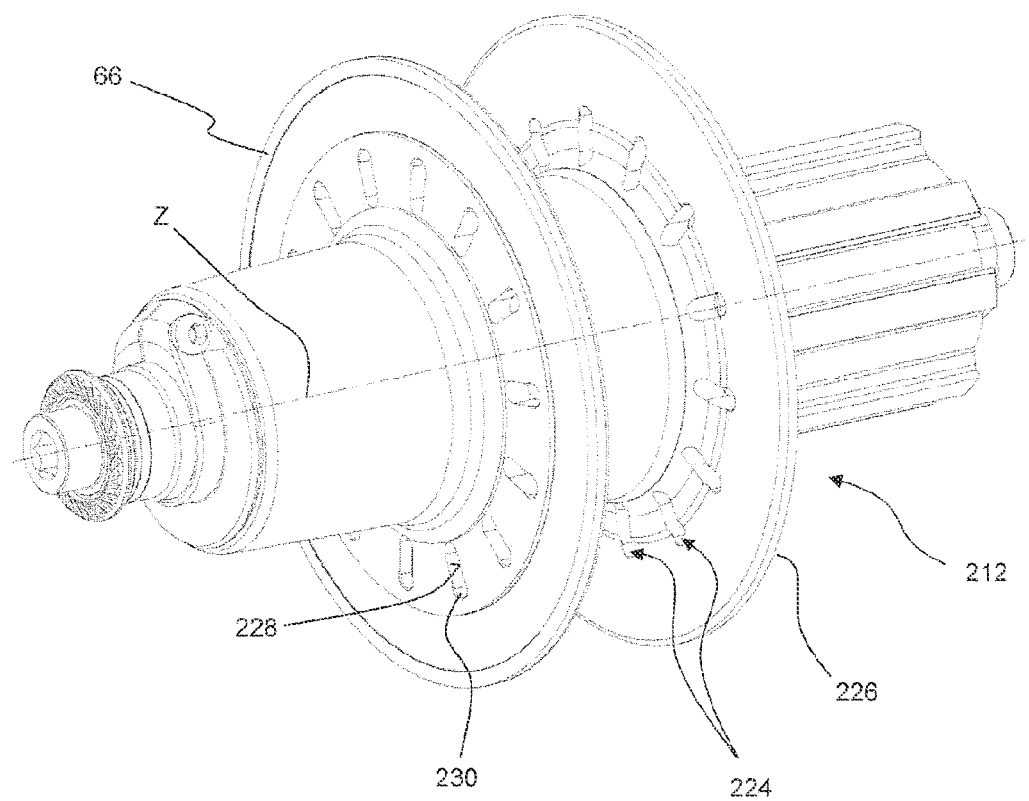
Figure 19:
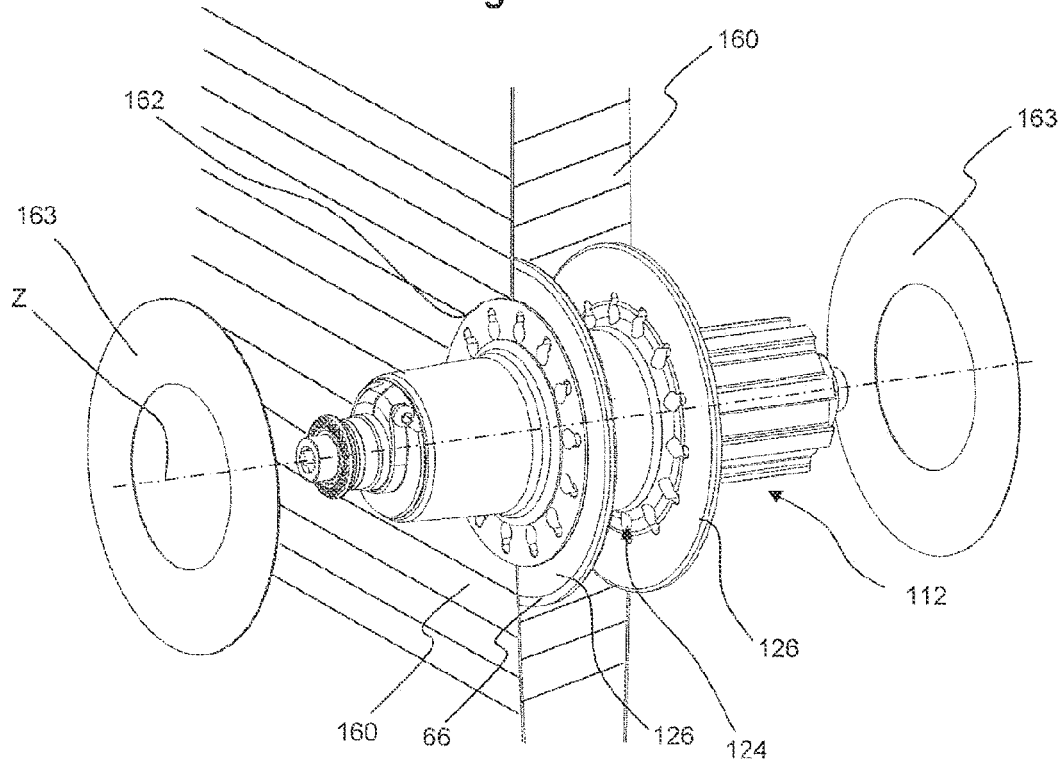

Further features and advantages of the invention will become clearer from the description of some preferred embodiments thereof, made with reference to the attached drawings, wherein:

FIG. 1 schematically illustrates a disc wheel according to an embodiment of the invention, FIGS. 2-14 schematically illustrate various details and steps of an embodiment of the manufacturing process of the wheel of FIG. 1, FIG. 15 shows a detail of other embodiments of the invention, FIG. 16 shows a detail of one of such other embodiments of the invention, FIGS. 17-18 show details of another of such other embodiments of the invention, FIG. 19 shows a detail of the embodiment of the invention of FIG. 16 or of FIG. 17-18, FIGS. 20-22 schematically show three more embodiments of the invention.

A manufacturing process of a disc wheel or lenticular wheel 10 (FIG. 1), according to an embodiment of the invention, is disclosed with reference to FIGS. 1-14.

Initially a hub 12, a rim 14, a plurality of spokes 16 and a corresponding plurality of nipples 18 and possibly centering washers 20 (FIG. 2, 7) are provided. The spokes 16 are extended between the hub 12 and the rim and each fixed through a nipple 18 and possibly a centering washer 20, in a similar manner to the case of manufacturing a spoked wheel, apart from what is specified hereinafter. Spoke 16, nipple 18 and washer 20 form a tensioning element.

In greater detail and with reference to FIGS. 2-6, in the embodiment shown there, each spoke 16 is of the straight-headed type, namely that extends along a rectilinear direction X or longitudinal axis X coinciding with its tensioning direction, and at the end of association with the hub 12 it has a head 22 that projects perpendicularly to the direction X of extension of the spoke 16, so as to prevent it from unthreading from a seat 24 of the hub 12.

The seats 24 for the spokes 16 are made on two flanges 26 of the hub 12, the flanges 26 being spaced apart and having a slightly frusto-conical shape according to a respective camber angle. In the embodiment shown, the seats 24 are equally spaced. The seats 24 are made on the facing faces of the flanges 26, while in known hubs the seats for straight-headed spokes are made on the outer faces of the flanges, opposite the facing faces. The flanges 26 can also have weight-reduction recesses or holes, for example as shown at 25.

Each seat 24 has a first recess 28 sized to receive the head 22 of the spoke 16 and a second recess communicating with it, sized to receive the stem of the spoke 16 but not the head 22, so as to hold the head 22 of the spoke 16 against unthreading in direction X.

Each spoke 16 is preferably provided with an anti-rotation device, comprising a flattened portion 32 of the stem, adjacent to the head 22.

Each spoke further has a cylindrical portion 34 of the stem, adjacent to the flattened portion 32 on the opposite side with respect to the head 22, and preferably a central portion 36.

The second recess 30 of the seat 24 is sized to receive the flattened portion 32 of the stem only in an angular position of the spoke 16 about its longitudinal axis X and thus prevent the rotation of the spoke 16 about its longitudinal axis X once the spoke 16 is inserted in the seat 24. The length of the flattened portion 32 is suitably sized to allow the spoke 16 to be mounted in the seat 24 of the hub 12.

Figure 4:
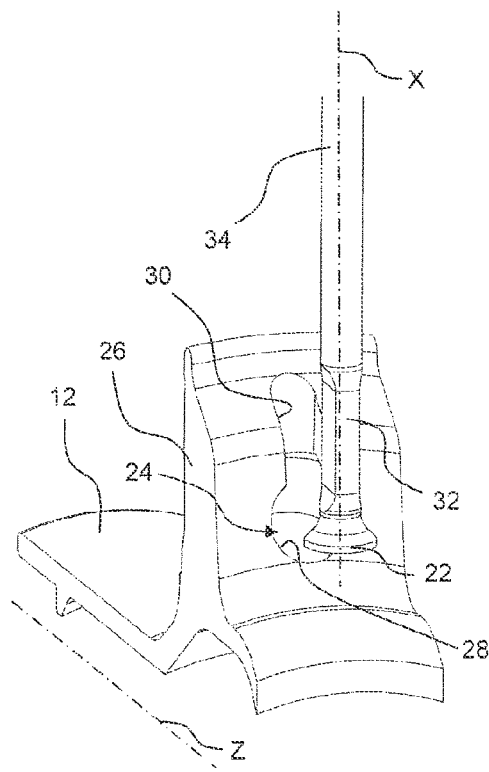
Figure 5:
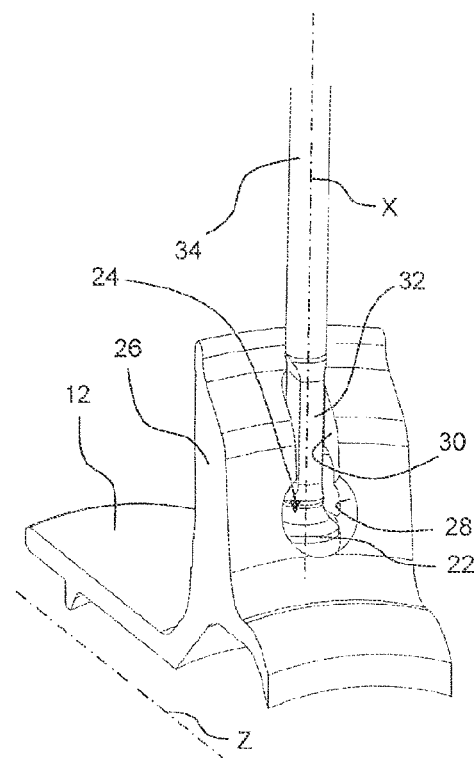
Figure 6:
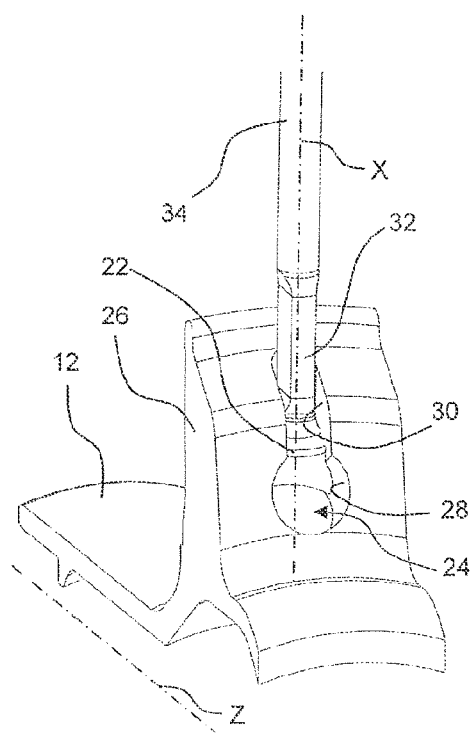

The mounting of the spoke 16 in the seat 24 of the hub 12 takes place by first making the head 22 face the first recess 28 of the seat 24 and orienting the spoke around the longitudinal axis X in such a way that the flattened portion 32 is correctly aligned with respect to the second recess 30 (see FIG. 4). The spoke 16 is thus inserted in the seat 24 with a movement in a direction perpendicular to the tensioning direction X, along the direction of the axis Z of the hub 12 (see FIG. 5). Thereafter, the spoke 16 is pulled away from the axis Z of the hub 12 so that the cylindrical portion 34 moves further away from the second recess 30 and the flattened portion 32 slides inside, while the head 22 stays inside the first recess 28, and until the head 22 goes into abutment against the side wall portions of the first recess 28 adjacent to the second recess 30 (see FIG. 6).

The dismounting of the spoke 16 from the seat 24 of the hub 12 takes place through the reverse operations, namely by pushing it along its axial direction X towards the axis Z of the hub 12; the flattened portion 32 slides in the second recess 30 while the head 22 enters into the second recess 30 no longer in abutment as stated above (FIG. 5), so that the spoke can be extracted along the direction of the axis Z of the hub 12, towards the flange 26 opposite the one in which the seat 24 is located (FIG. 4).

The central portion 36 of the stem of the spoke is preferably flattened. More preferably, the flattened central portion 36 of the spoke 16 is oriented at 90°, about the longitudinal axis X of the spoke 16, with respect to the anti-rotation flattened portion 32. The cylindrical portion 34 arranged between the two flattened portions 32, 36 acts as a joint between them.

Figure 7:
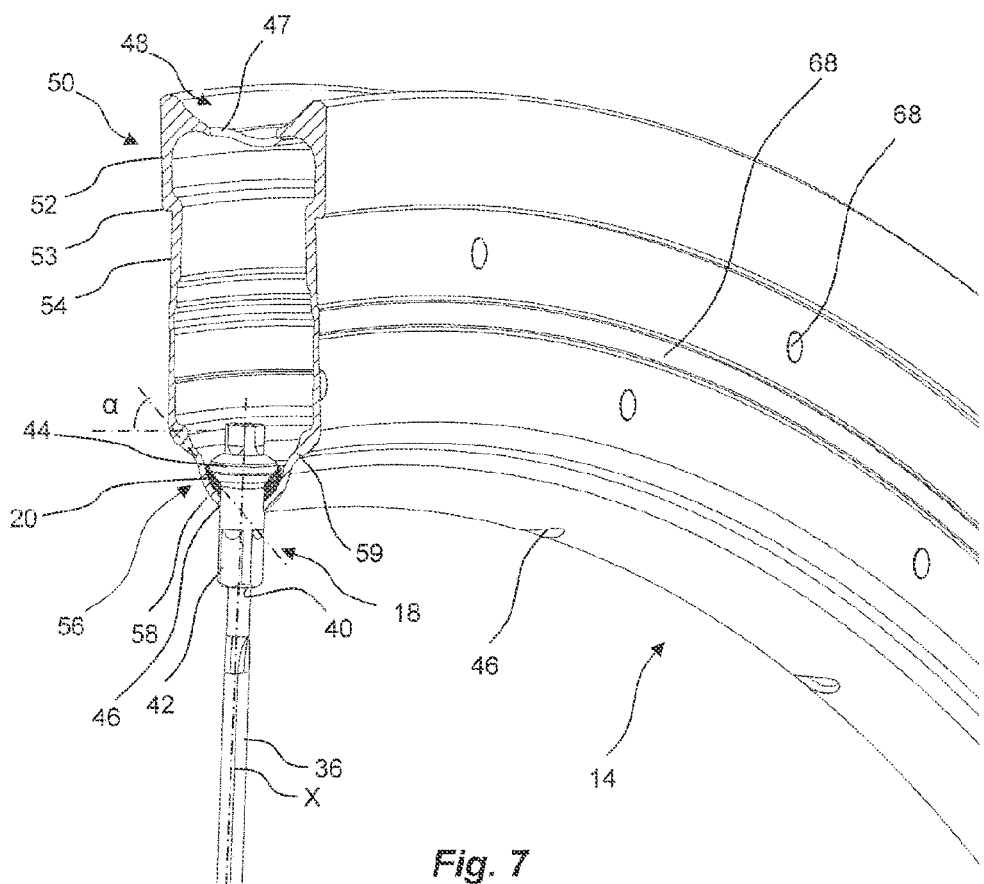

As can be seen more clearly in FIG. 7, at the end of association with the rim 14, each spoke 16 has a threading 38 (FIG. 14) intended for the coupling in a threaded hole 40 of a stem 42 of the nipple 18. The nipple 18 has a head 44 that projects perpendicularly to the longitudinal direction of the stem 42 of the nipple 18, coinciding with the tensioning direction X of the spoke 16, so as to prevent it from unthreading from a seat 46 of the rim 14, in the form of a smooth circular hole. As stated, between the nipple 18 and the seat 46 of the rim 14 there can be a centering washer 20, which allows the spontaneous orientation of the spoke 16 with the suitable camber angle.

The flattened central portion 36 of the spoke 16 is advantageous since it allows the spoke 16 to be gripped to hold it against rotation during the screwing in of the nipple 18 and tensioning. Moreover, it is advantageous for the application of a strain gauge for measurements of elongation from which to obtain indications on the tensioning of the spoke 16.

The rim 14 is a hollow annular element made of metal, typically aluminium, or of composite material, which comprises radially on the outside a channel-shaped wall 48 for coupling with the tyre. The channel 48 of the rim 14 shown is for a tubular tyre, but it could have wings for holding a tyre with air chamber and outer tyre or a tubeless tyre.

Radially inside the channel 48 for coupling the tyre, the rim 14 comprises two side walls 50 each having a radially outer braking region 52 and a radially inner region 54 for coupling a disc described later, the two regions forming a step 53, the regions 54 being less spaced apart than the regions 52. The two side walls 50 are joined by a radially inner wall or lower bridge 56, in which said seats 46 are made.

The two side walls 50 are slightly frusto-conical so as to adapt to the camber angles of the flanges 26 of the hub 12 and of the discs described later.

The two side walls 50 can also have a variable thickness as shown, depending on the mechanical stresses foreseen in the various areas. In the case of a carbon rim 14, the various areas can be formed from a different number of plies of composite material.

The seats 46 are preferably equally spaced as shown, and used alternately for a spoke 16 extending towards one of the flanges 26 of the hub 12 and for a spoke extending towards the other flange 26. On the wall 48 forming the tyre coupling channel there are provided openings 47 for access to the seats 46, to insert the nipples 18 therein and screw them to tighten the spokes 16. In the case of a tubeless tyre, the openings 47 are plugged in a subsequent processing step, for example by gluing or moulding a strip (not shown) of composite material on the bottom of the channel 48.

Preferably, the lower bridge 56 of the rim 14 has a central ribbing 58, projecting radially inwards towards the hub 12 and having a cross section shaped like a semi-circumference, and regions 59 at the side of the ribbing 58 diverging apart, extending at an angle $\alpha$ of about 45° with respect to the direction of the axis Z of the hub and of the rim, so as to join together at an angle of about 135° both with the ribbing 58 and with the side walls 50. The seats 46 of the rim 14 are made on the bottom of the ribbing 58.

The ribbing 58, together with the centering washers 20, has the function of reinforcing the rim 14 against the tendency towards undulating deformation or "waviness" brought on by the tensioning of the spokes 16 towards the two flanges 26 of the hub 12 according to the respective camber angles.

The rim 14 could have further stiffening walls and/or have a different shape from the one shown, for example an asymmetrical shape, a higher or lower profile, etc.

The hub 12 is preferably provided for a radial type spoking as shown—wherein the spokes extend between the hub 12 and the rim 14 along radial directions, apart from the camber.

There can be means for coupling the spoke 16 both to the rim 14 and to the hub 12 that are different from those shown and described above.

Going back to the manufacturing process, before mounting the spokes 16, the rim 14 is preferably prepared for the application of a gluing substance, for example, in the case of an aluminium rim, through a known FPL/PPA process, which comprises a chrome acid bath that opens the pores of the aluminium and the application of an anti-corrosion primer.

Figure 8:
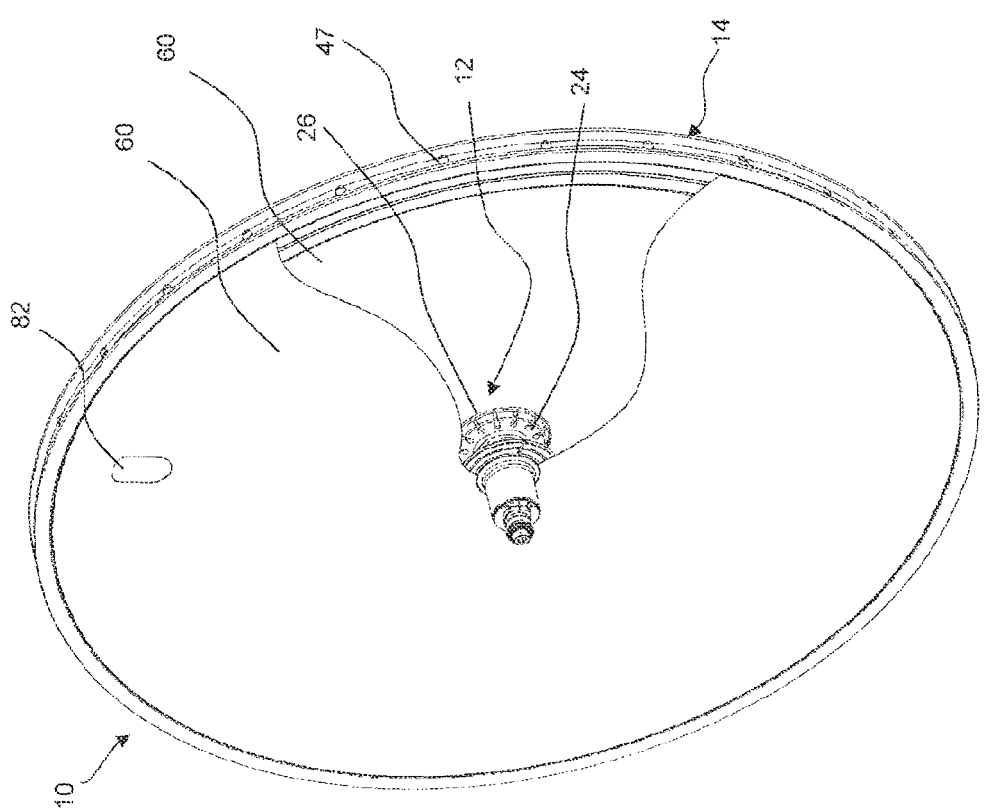
Figure 3:
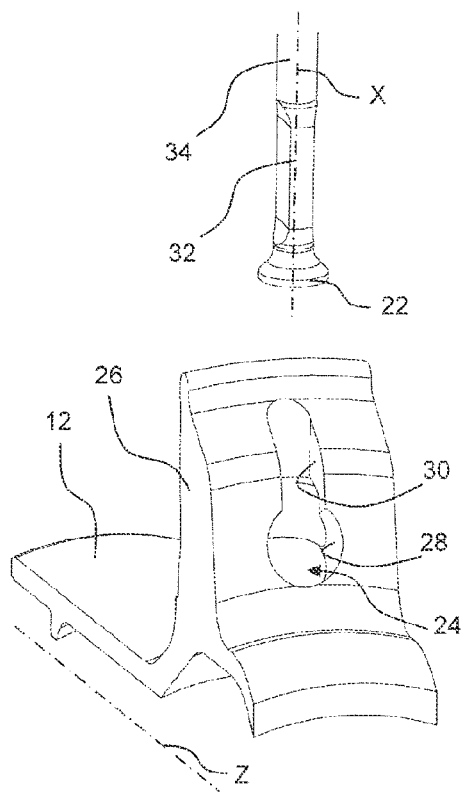

Once the spokes 16 are mounted extending between the hub 12 and the rim 14 as shown in FIG. 8, according to the invention they are tensioned.

Preferably, an over-tension, of at least 5%, preferably of at least 20% more, is applied with respect to a conventional spoked wheel having the same hub 12 and the same rim 14. In detail, while conventionally the spokes of a bicycle spoked wheel are tensioned to 1000-1200 N, according to the invention they are tensioned for example to 1500 N.

It is worthwhile emphasizing that making the seats 24 on the facing faces of the flanges 26 of the hub reduces the camber angles with respect to a conventional rim, which advantageously makes it possible to better impart the tension between hub 12 and rim 14, the stress of the spokes 16 being equal.

Moreover, the spokes 16 are preferably over-sized in thickness, with respect to a conventional spoked wheel having the same hub 12 and the same rim 14, so as to undergo less elongation with respect to conventional spokes and therefore be able to better impart the tension between hub 12 and rim 14. Moreover, by limiting or avoiding elongation it is possible to reuse the spokes 16, after their removal as described later on, for manufacturing a further wheel 10. Furthermore, having a greater section, the threading 38 of the spoke 16 and the threading of the hole 40 of the nipple 18 have larger contact surfaces and therefore greater resistance to the tensioning of the spoke 16. It is also made easier to use a torque meter to evaluate the screwing torque.

During the tensioning of the spokes 16, the centering and the circularity of the wheel 10 is monitored and ensured, if necessary repeating the tensioning of the individual spokes 16.

Preferably, a thrust is also applied on the rim 12 and/or on the hub 14 in the direction of the axis Z of the hub 12, for example a thrust of 0.5 bar, to simulate the stress on the wheel during a subsequent gluing step of discs described hereafter, if necessary repeating the tensioning of the individual spokes 16. The simulation thrust can be applied for example with a pneumatic or hydraulic system used during said gluing step (cf. FIG. 13) or by arranging the assembly being manufacturing on a plane and resting weights on the rim 12 and/or on the hub 14.

Figure 9:
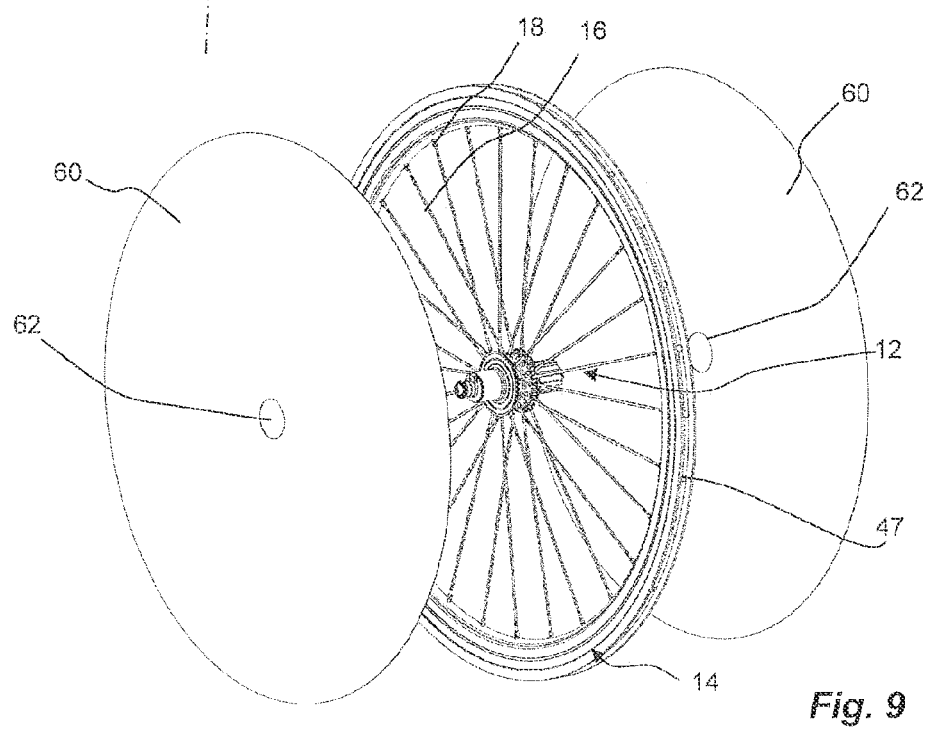

Thereafter, as shown in FIG. 9, two discs 60 equipped with a central hole 62 are threaded on the hub 12 from its axially opposite ends, and rested on the flanges 26 of the hub 12 and on the rim 14 at the regions 54, with the interposition of an adhesive substance 64. In the magnifications of FIG. 10 and FIG. 11 only one disc 60 is shown. Moreover, in FIGS. 10-11, as well as in FIG. 13 described later, the spokes 16 are not shown for the sake of clarity.

The discs 60 are configured as slightly frusto-conical, according to respective camber angles. The discs 60 have a diameter such as to cover the regions 54 of the side walls 50 of the rim 14 as exactly as possible up to the step 53.

In greater detail, the outer face of the flanges 26 of the hub 12 and/or the regions 54 of the side walls of the rim 14 for coupling with the discs 60 preferably have lugs 66, 68 (see also FIGS. 2 and 7) slightly projecting for some points of the discs 60 to rest on so that most of the surface of the discs 60 is a certain distance from the surface of the flanges 26 and of the side walls 50, such as to ensure a suitable thickness of adhesive substance 64. For example, the lugs 66, 68 can comprise a circumferential lug extending all around the axis Z of the hub 12 and the rim 14 and/or a plurality of small lugs. The lugs 66, 68 can for example have an elevation of 0.1-0.2 mm to ensure a film of gluing material 64 of such an amount. The flanges 26 of the hub 12 also preferably have channels 67 extending in a radial direction for the excess adhesive substance 64 to come out from. Similar channels can be provided in the rim 14.

The discs 60 can be metallic, but they are preferably made of composite material, namely of polymeric material reinforced by structural fibre. The structural fibre is preferably carbon fibre, but glass fibre, boron fibre, aramid fibre, ceramic fibre and their combinations can also be used. The polymeric material is preferably of the thermosetting type, preferably a thermosetting epoxy resin, but a thermoplastic polymeric material can be used.

Figure 12:
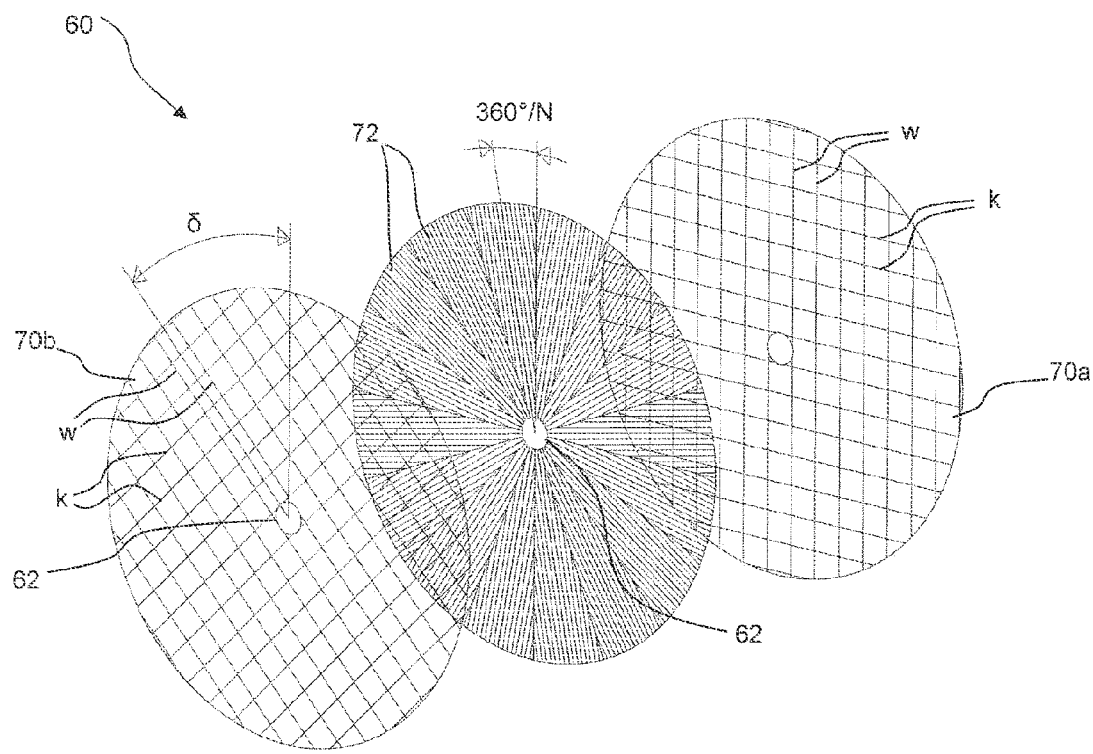

Preferably, as shown in entirely schematic form in FIG. 12, the discs 60 are made of a plurality of plies of composite material. In each ply, the structural fibre is preferably woven fibre, comprising fibres w extending according to a weft direction and fibres k extending according to a warp direction substantially perpendicular to it. Preferably, each disc 60 has two such plies 70a and 70b, having the warp/weft directions angularly offset by an angle δ preferably equal to 45°. In this way, the structural fibre extends in the wheel 10 according to a plurality of radial/diametral directions, including the radial directions that can be identified as 0°-45°-90°-135°-180°-225°-270°-315°, as well as according to a plurality of chords, namely directions extending between a pair of points of the rim not diametrically opposite.

Preferably, moreover, each disc 60 also has a plurality of patches 72 of composite material ply in which the structural fibre is unidirectional, extending according to a direction that becomes a radial direction in the wheel 10. As an example, N patches 72 are shown for which reason the fibre extends according to N directions radially spaced by 360°/N, and according to directions that are adjacent and parallel to such N directions.

Various other configurations of plies and patches are possible in the discs 60. For example, in an alternative, each disc 60 can have three such plies, having the weft/warp directions angularly offset by 120°.

Figure 13:
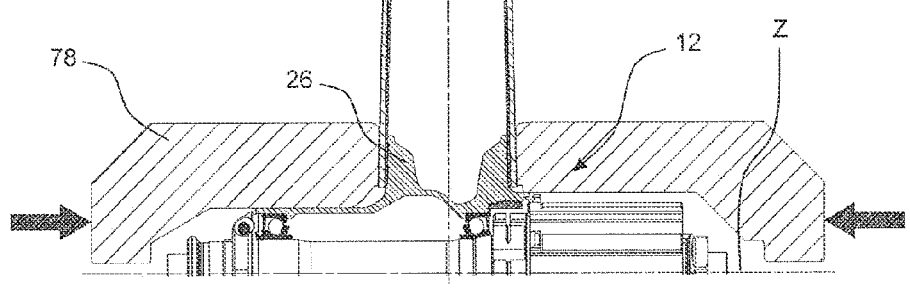

The discs 60 made as stated above preferably of composite material, although already having undergone hardening/polymerisation, are very thin and therefore, to avoid unsuitable stresses during manufacturing of the wheel 10, preferably they are initially applied and fixed in a removable manner, like for example through double-sided adhesive tape 76 (shown in an entirely schematic way and out of scale in FIG. 13), to a respective applicator 74. FIGS. 10-11 and 13 show frusto-conical shaped applicators 74 similar to the discs 60, where the discs 60 are adherent to the concave face of the applicator 74. In other embodiments, the applicators 74 can be annular, fan-like, bell-shaped, have a framework made of rods or other.

The adhesive substance 64 arranged between the discs 60 and the flanges 26 of the hubs 12 and the regions 54 of the rims 14 is preferably a bicomponent epoxy resin.

As shown in FIG. 13, the assembly being processed is then put under a press with a suitable compression force, for example 2000 N at the areas provided with adhesive substance 64. For example, a pair of pressing rings 78 can be provided at the hub 12, and a pair of pressing rings 80 at the rim 14.

Advantageously, the compression force applied by the pressing rings 78 can be adjusted independently of the compression force applied by the pressing rings 80, so as to take possible misalignments between hub 12 and rim 14 into account.

The pressure is maintained for a suitable time, for example 24 hours. Thereafter, the assembly is removed from the press 78, 80 and the assembly being processed is left to rest for a suitable time until the complete hardening of the adhesive substance 64, for example for two days.

Figure 14:
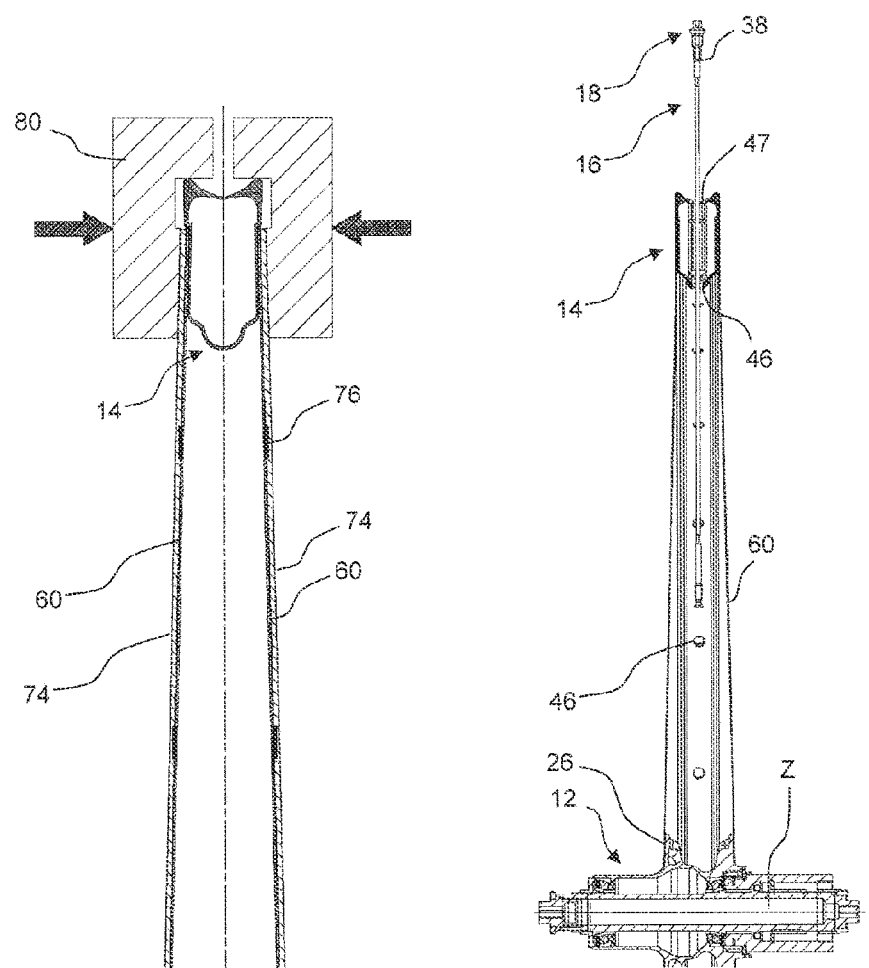

Thereafter, the tension of the spokes 16 is loosened by partially unscrewing the nipples 18, then the applicators 74 are removed where provided for, for example by acting with a broad knife to detach the double-sided adhesive tape 76. Finally, the spokes 16 are completely dismounted—with the movements described above to unseat the head 22 from the seat 24 in the hub 12—and extracted from the rim 14 through the openings 47 as shown in FIG. 14; moreover, an opening 82 (FIG. 1) for access to the valve of the tyre is made in one of the two discs 60, thus completing the disc wheel 10.

It should be noted that thanks to the fact that the seats 24 are made on the facing faces of the flanges 26 of the rim 12, the spokes 16 can be dismounted from the hub 12 despite the presence of the discs 60.

The Applicant believes that through the gluing of the discs 60 to the hub 12 and to the rim 14 when the tensioned spokes 16 are present between them, and the subsequent release of such tension, the discs 60 preserve a tensile stress and therefore obtain a structural role that replaces that of the tensioned spokes in a conventional spoked wheel.

The Applicant also believes that the structural fibre extending according to radial directions as described above significantly contributes to carry out the aforementioned structural role.

The Applicant also believes that such a structural fibre extending according to radial directions contributes to the resistance to bending of the wheel 10—namely the resistance against loads applied in the axial direction in an off axis position such as the loads when the rim and the hub tend to become offset due to the absorption of roughness of the ground or a jump, or more simply to make a bend or when the cyclist is standing on the pedals and the bicycle moves forward with right and left tilt.

The Applicant also believes that the structural fibre extending according to chord directions as described above contributes to the resistance to torsion of the wheel 10—namely the resistance against loads applied in the tangential direction like that during pedalling and in braking conditions with disc brakes and acceleration, when the rim tends to have a relative rotation with respect to the hub.

The resistance to bending of the wheel 10 of the invention, passing from the intermediate condition with the spokes tensioned to the final condition, increases. The Applicant believes that this improvement is due to the fact that each preloaded disc 60 behaves like an infinite number of spokes an infinitely small distance apart, with a consequent distribution of the stresses over the entire surface of the disc.

FIGS. 15-19 show some details of two embodiments that differ from the one illustrated and described above in that the spokes used in the temporary tensioning step are curved-headed spokes 116. As shown in FIG. 15, such spokes 116 have a flattened central portion 136 extending along a rectilinear tensioning direction X and, at the end for associating with the rim 14, they are identical to the spokes 16 described above, therefore comprising a threading 38. At the end for associating with the hub 112, 212, the spokes 116 have a curved portion with a cylindrical section defining a first portion 134 with cylindrical section that extends along the tensioning direction X, and a second portion 135 with a cylindrical section that extends along a rectilinear direction Y at about 90° from such a tensioning direction X, as well as a head 122 that projects perpendicularly to the direction Y, so as to prevent it from unthreading from a seat 124, 224 of the hub 112, 212.

The seats 124, 224 for the spokes 116 are made on two flanges 126, 226 of the hub 112, 212, spaced apart and slightly frusto-conical. In the embodiments shown, the seats 124, 224 are equally spaced.

In the hub 112 of FIG. 16, each seat 124 has a through hole having a first portion 128 sized to receive the head 122 of the spoke 116, and a second portion 130 communicating with it, sized to receive the stem of the spoke 116 but not the head 122 of the spoke 16, so as to hold it against unthreading in direction X.

The mounting of the spoke 116 in the seat 124 of the hub 112 takes place by threading the head 122 and the second cylindrical portion 135 of the stem in the first portion 128 of the through hole or seat 124, and then pulling the spoke 116 away from the axis Z of the hub 12 so that the second cylindrical portion 135 seats into the second portion 130 of the through hole or seat 124, through which the head 122 cannot pass so that the spoke 116 remains held.

The dismounting of the spoke 116 from the seat 124 of the hub 112 takes place through the reverse operations, namely pushing it in the axial direction X towards the axis Z of the hub 112 until the second cylindrical portion 135 comes out from the second portion 130 of the through hole or seat 124 inserting into the first portion 128, so that the spoke can be extracted through the flange 126 in which the seat 124 is located. Alternatively, in order to make it easier to dismount the spoke, the head 122 of the spoke 116 can be milled away.

In the hub 212 of FIG. 17, each seat 224 has a through hole having a first portion 228 sized to receive the stem of the spoke 116 and a second portion 230 communicating with it, sized to receive the stem of the spoke 216 and hold the head 222 of the spoke 116 against unthreading in the direction X.

The mounting of the spoke 116 in the seat 224 del hub 212 takes place by threading its end for associating with the rim through the first portion 228, extracting it for its entire length until it is rotated by about 90° in such a way as to bring the second cylindrical portion 135 of the stem into the first portion 228 of the through hole or seat 224, and then pulling the spoke 116 away from the axis Z of the hub 212 so that the second cylindrical portion 135 seats into the second portion 230 of the through hole or seat 224, through which the head 122 cannot pass so that the spoke 116 remains held.

The dismounting of the spoke 116 from the seat 224 of the hub 212 takes place through the reverse operations, namely pushing it in the axial direction X towards the axis Z of the hub 212 until the second cylindrical portion 135 comes out from the second portion 230 of the through hole or seat 224 inserting into the first portion 228, so that the end of the spoke for associating with the hub can be rotated by about 90° while the spoke 116 is extracted through the flange 226 in which the seat 224 is located. The spoke 116 is sufficiently flexible to allow such a rotation, as schematised in FIG. 18.

In both embodiments with spokes 116 having a curved head, the manufacturing process differs from the one described above for how the mounting of the spokes 116 and their dismounting take place. Moreover, since the seats 124, 224 must remain accessible for the removal of the spokes 116, as shown in FIG. 19—which just as an example is relative to the hub 112—the discs 160 have a correspondingly wide hole 162 and therefore it is possible to provide the additional step of gluing two substantially flat annular covers 163 at the outer faces of the two flanges 126, 226 of the hubs 112, 212, after the step of dismounting and extracting the spokes 116, to cover the seats 124, 224.

FIG. 20 illustrates a step of the process relative to an embodiment in which each disc is replaced by a spoke-type structural element 360. The spoke-type elements 360 are configured according to parts of a slightly frusto-conical surface, according to suitable camber angles, but otherwise they are substantially two-dimensional. The manufacturing process is identical to the one described above, with the warning that the two spoked elements 360 are applied with the spokes 361 in corresponding radial positions, so as to be facing. It is however also possible to offset the spokes 361 of the two spoke-type elements 360 so as to double the number of spokes in the wheel.

Moreover, as can also be seen from FIG. 20, just groups of spokes are provided at the positions in which the spokes 361 of the spoke-type elements 360 will be applied.

The removal of the spokes 16, 116 can take place not only from the openings 47 for access to the seats 46 of the rim 14, but also through the gap 363 that forms between the two opposite spokes of the spoke-type elements 360.

FIG. 21 illustrates a step of the process relative to an embodiment that differs from that of FIG. 20 in that each spoke-type structural element 460 is not substantially two-dimensional, but rather it has edges 464 bent towards the concavity of the frusto-conical shape and configured and sized in such a way that when the spokes 461 of the two spoke-type elements 460 are arranged facing one another in corresponding radial positions, the edges 464 join together and as a whole define closed spokes.

In this case, then removal of the spokes 16, 116 can only take place from the openings 47 for access to the seats 46 of the rim 14, but the sharp edges of the spoked elements 460 are avoided, which could be cutting.

FIG. 22 illustrates a step of the process relative to an embodiment that differs from that of FIG. 20 in that each spoke-type structural element 560 has an annular portion 566 at the ends of the spokes 561, to increase the gluing surface to the rim 14. Instead of an annular portion 566 there can be widened portions at the ends of each spoke 561, not joined together.

Such an annular portion can also be provided in the closed spokes embodiment of FIG. 21.

The embodiments of FIGS. 20-22 show five spokes, but their number can be different.

The embodiments of FIGS. 20-22 show straight headed spokes 16 and therefore the hub 12, but alternatively also in the case of a spoke-type wheel curved headed spokes 116 and one of the hubs 112, 212 could be used.

It is worth emphasising that the hub, the rim and the spokes can also differ substantially from the embodiments shown.

In other embodiments, it is possible to use tensioning elements different from spoke 16, 116, nipple 18 and washer 20. For example, it is possible to use an apparatus capable of compressing the rim 14 along its circumference, from the outside in the radial direction towards the axis of the hub 12. In this case, advantageously it is possible to avoid the seats 24, 124, 224, and 46 for the spokes in the rim 14 and in the hub 12, 112, 212 as well as the openings 47 in the rim 14, directly allowing the application of tubeless tyres.

In particular, in this case it is possible to use a single disc or spoke-type structural element mounted in a central position along the axis Z of the hub, possibly providing suitable flanges on hub and/or rim.

Vice-versa, more than two such structural elements could be applied.

Also in the case of disc-type structural elements, it is possible, instead of arranging the spokes along the entire circumference of the hub 12, 112, 212 and of the rim 14, to only provide groups of spokes at positions spaced along the circumference.

Vice-versa, also in the case of spoke-type structural elements, it is possible to arrange the spokes along the entire circumference of the hub 12, 112, 212 and of the rim 14.

What is claimed is:

1. Process for manufacturing a bicycle disc wheel or spoked wheel, comprising the sequential steps of:
    a) providing a hub and a rim,
    b) applying a compression onto the rim towards the hub elastically deforming the rim, c) rendering at least one disc or spoke-type structural element integral with the hub and the rim, and d) removing the compression onto the rim applied in step b).

2. Process according to claim 1, wherein step b) comprises extending a plurality of tensioning elements between the hub and the rim and tensioning them, and step d) comprises removing the tensioning elements.

3. Process according to claim 2, wherein the tensioning elements comprise bicycle spokes.

4. Process according to claim 1, wherein step c) comprises inserting a pair of disc or spoke-type structural elements onto the hub from axially opposite ends, and gluing each disc or spoke-type structural elements to the hub and to the rim.

5. Process according to claim 4, wherein step b) comprises the step of simulating stress on the rim during the subsequent gluing step.

6. Process according to claim 4, wherein step b) comprises the step of simulating stress on the hub during the subsequent gluing step.

7. Process according to claim 4, wherein step b) comprises the step of simulating stress on the hub and the rim during the subsequent gluing step.

8. Process according to claim 1, wherein step c) comprises press gluing said at least one structural element while it is removably associated with a respective support applicator.

9. A bicycle wheel comprising:

a hub;

a rim; and, at least one disc-type structural element rendered integral with the hub and the rim, wherein said at least one structural element is pretensioned.

10. The wheel according to claim 9, wherein said at least one structural element comprises a pair of disc structural elements, each rendered integral with the hub and the rim.

11. The wheel according to claim 9, wherein the hub comprises a plurality of empty spoke attachment seats.

12. The wheel according to claim 9, wherein the hub comprises a pair of flanges having facing faces, and a plurality of spoke attachment seats are hollowed out in the facing faces of the flanges.

13. The wheel according to claim 9, wherein the hub comprises projecting lugs at the areas of contact with said at least one structural element.

14. The wheel according to claim 9, wherein said at least one structural element is made of composite material comprising fibre extending along a plurality of radial directions.

15. The wheel according to claim 9, wherein said at least one structural element is made of composite material comprising fibre extending along a plurality of chord directions.

16. The wheel according to claim 9, wherein the rim comprises a plurality of empty spoke attachment seats.

17. The wheel according to claim 9, wherein the rim and the hub comprise a plurality of empty spoke attachment seats.

18. The wheel according to claim 9, wherein the rim comprises projecting lugs at the areas of contact with said at least one structural element.

19. The wheel according to claim 9, wherein the hub and the rim comprise projecting lugs at the areas of contact with said at least one structural element.

* * * * *